United States Patent [19]

Auge et al.

[11] Patent Number: 5,661,553
[45] Date of Patent: Aug. 26, 1997

[54] METHOD OF DETECTING VARIATION IN THE DIAMETER OF AN OPTICAL FIBER AND OPTICAL FIBER FABRICATION METHOD

[75] Inventors: Jacques Auge, Saint Cheron; Olivier Mercereau, Verrieres le Buisson; Claude Brehm, Montrouge; Henri Gagnaire, St Etienne, all of France

[73] Assignee: Alcatel Fibres Optiques, Bezons Cedex, France

[21] Appl. No.: 628,239

[22] Filed: Apr. 4, 1996

[30] Foreign Application Priority Data

Apr. 5, 1995 [FR] France .................................. 95 04027

[51] Int. Cl.⁶ .................................................. G01B 11/10
[52] U.S. Cl. ..................................................... 356/73.1
[58] Field of Search ........................................ 356/73.1

[56] References Cited

U.S. PATENT DOCUMENTS 3,982,816  9/1976  Watkins .................................. 356/73.1
4,362,943  12/1982  Presby .................................. 356/73.1 X

FOREIGN PATENT DOCUMENTS 0 608 538 A1  8/1994  European Pat. Off. .
WO95/03524  2/1995  WIPO .

OTHER PUBLICATIONS

*Patent Abstracts of Japan*, vol. 010, No. 358 (P–522) dated Dec. 2, 1986 corresponding to JP A–61 155893 (Toshiba Corp).

D. H. Smitgall et al, "An Optical Fiber Diameter Measurement System Using Forward Scattered Light", *IEEE Transactions on Industrial Electronics and Control Instrumentation*, vol. IECI–25, No. 2, May 1978 US, pp. 108–112.

*Primary Examiner*—Vincent P. McGraw
*Attorney, Agent, or Firm*—Sughrue, Mion, Zinn, Macpeak & Seas

[57] ABSTRACT

A method of detecting variation in the diameter of an optical fiber includes the following steps:

- transversely illuminating a portion of the fiber by means of an incident light beam,
- measuring a radiation pattern produced by the fiber portion in a predetermined acute angular sector around the fiber, and
- detecting variation in the diameter of the optical fiber causing modification of the angular radiation pattern produced in this way.

The angular sector is defined by angles of 90° and 105° or by angles of 255° and 270°.

8 Claims, 4 Drawing Sheets

METHOD OF DETECTING VARIATION IN THE DIAMETER OF AN OPTICAL FIBER AND OPTICAL FIBER FABRICATION METHOD

BACKGROUND OF THE INVENTION

1. Field of the Invention

The present invention concerns a method of detecting variation in the diameter of a substantially cylindrical elongate optical body such as an optical fiber. The invention also provides an optical fiber fabrication method using a detection method of this kind. The fabrication method guarantees a regular optical fiber diameter with great accuracy.

2. Description of the Prior Art

The prior art discloses two methods of detecting variation in the diameter of an optical fiber.

Referring to FIG. 1, the two methods illuminate a portion of an optical fiber 1 which is assumed, for purposes of explanation, to lie on an axis N normal to a reference plane P. The incident illumination light beam F lies on an axis x in the reference plane P and is projected normally onto the fiber 1. The axis x is an oriented axis in the direction of propagation of the light beam. The optical fiber 1 moves relative to the light beam F along the normal axis N. As the result of optical propagation/reflection phenomena of the light in/on the fiber, a particular radiation pattern is produced around the fiber 1. The two prior art methods analyze this radiation pattern in a limited angular sector around the fiber by measuring intensity levels of light diffused by the portion of the optical fiber 1 at respective points in the reference plane that are delimited by said limited angular sector defined around the normal axis N. The angular sector in question is defined by two angles that have an apex formed by the intersection between the normal axis and the reference plane and that are oriented in a given circumferential direction, arbitrarily chosen as the clockwise direction, about the oriented axis x.

The first prior art method, described in the article by J. Danière et al. entitled "Un nouvel appareillage pour enregistrer les fluctuations de diamètre d'une fibre optique" ("A new device for recording optical fiber diameter fluctuations"), published in J. Phys. Sci. Intrum., vol. 18, 1985, delimits the acute angular sector for obtaining the radiation pattern by the two angles of 10° C. and 80° C. This angular sector is denoted S1 in FIG. 1. The luminosity levels at respective points in the sector are in practise measured by means of a CCD diode strip, for example. The radiation pattern obtained in the angular sector in question is in the form of a set of interference fringes which are the result of interference between light waves in the incident beam F that are reflected from the exterior surface of the fiber 1 on which said beam impinges and light waves refracted at the interior surface of the fiber on the side opposite said beam. A radiation pattern of this kind has the remarkable property of varying in accordance with the diameter of the fiber. To be more precise, variation in the diameter of the fiber causes angular translation of the pattern. It is therefore possible to detect variation in the diameter of the optical fiber by detecting modification of the angular radiation pattern. Modification of the radiation pattern can be detected with reference to a reference radiation pattern held in memory and obtained for an optical fiber having a reference diameter.

The second prior art method is implemented in exactly the same way as just described for the first method, except that the angular sector used to obtain the radiation pattern is delimited by the two angles of 170° and 190°, as shown at S2 in FIG. 1. This method differs from the first method described in that the optical phenomena responsible for the effect obtained are not interference phenomena but rather backscattering phenomena. The effect obtained is exactly the same as that previously described in the sense that variation in the diameter of the optical fiber causes overall angular translation of the resulting radiation pattern in the 170°–190° acute angular sector.

Recent advances in fiber fabrication mean that the defects to be detected on an optical fiber are now in the order of 50 nm. The two prior art methods described above have the drawback that their sensitivity is too low to achieve this. For example, in the first method described the overall translation of the radiation pattern in the 10°–70° angular sector has a period of 0.45 μm, which means that the radiation pattern in the 10°–70° angular sector is reproduced substantially identically for fiber diameters that are equal to within a multiple of a 0.45 μm increment. Variation of the fiber diameter therefore moves the radiation pattern in translation relatively slowly. Limitations of optical detection and measuring devices are such that a fiber diameter variation in the order of 110 nm is the smallest that can be detected.

A first objective of the invention is to remedy the aforementioned drawback by providing a method of detecting variation in the diameter of an optical fiber with a sensitivity that is very high compared to the prior art technique.

A second objective of the invention is to provide an optical fiber fabrication method using a detection method of this kind.

SUMMARY OF THE INVENTION

To this end, in a method of detecting a variation in the diameter of a substantially cylindrical elongate optical body at least one portion of which lies on an axis normal to a reference plane, comprising the following steps:

illuminating a portion of said optical body by means of an incident light beam that lies on an axis in said reference plane and oriented in the propagation direction of the light beam, said optical body moving relative to said light beam, measuring luminous intensity levels diffused by said portion of said body at respective points of said reference plane delimited by a predetermined acute angular sector about said normal axis in order to produce an angular radiation pattern, said angular sector being defined by two angles that have an apex formed by the intersection of said normal axis and said reference plane, and detecting variation in said diameter of said elongate optical body causing modification of said angular radiation diagram so produced, said angular sector is substantially defined by the two angles of 90° and 105° defined in the clockwise direction relative to said oriented axis.

In a different embodiment of the invention, the angular sector is substantially defined by the two angles of 255° and 270°.

The modification of the radiation pattern is typically an angular translation within the angular sector of a maximal intensity level of light diffused by the portion of the elongate body.

Variation in the diameter of said elongate optical body is advantageously detected by comparing two consecutively produced radiation patterns.

A device in accordance with the invention for implementing the method comprises:

a light source for producing said incident light beam, light analyzer means adapted to produce said radiation pattern and having a receiving surface covering all or part of said angular sector, and processor means for detecting modification of said angular radiation pattern.

The processor means comprise means for comparing two consecutively produced radiation patterns.

The method of fabricating an optical fiber comprises the following steps:

heating a preform, drawing said optical fiber from said heated preform, said fiber lying on an axis normal to a reference plane, illuminating a portion of said optical fiber by means of an incident light beam lying on an axis in said reference plane and oriented in the propagation direction of said light beam, measuring intensity levels of light diffused by said optical fiber at respective points in said reference plane delimited by a predetermined acute angular sector about said normal axis in order to produce an angular radiation pattern, said angular sector being delimited by two angles that have an apex formed by the intersection of said normal axis and said reference plane, detecting variation in said diameter of said optical fiber causing modification of said angular radiation pattern so produced, and applying feedback to control the speed of said fiber so as to slave said angular radiation pattern so produced to a reference radiation pattern, wherein said angular sector is substantially defined by the two angles 90° and 105° defined in the clockwise direction relative to said oriented axis.

In a different embodiment of the fabrication method the angular sector is substantially defined by the two angles of 255° and 270°.

Other features and advantages of the present invention will emerge more clearly from a reading of the following description with reference to the corresponding appended drawings.

DETAILED DESCRIPTION OF THE PREFERRED EMBODIMENT

Figure 1:
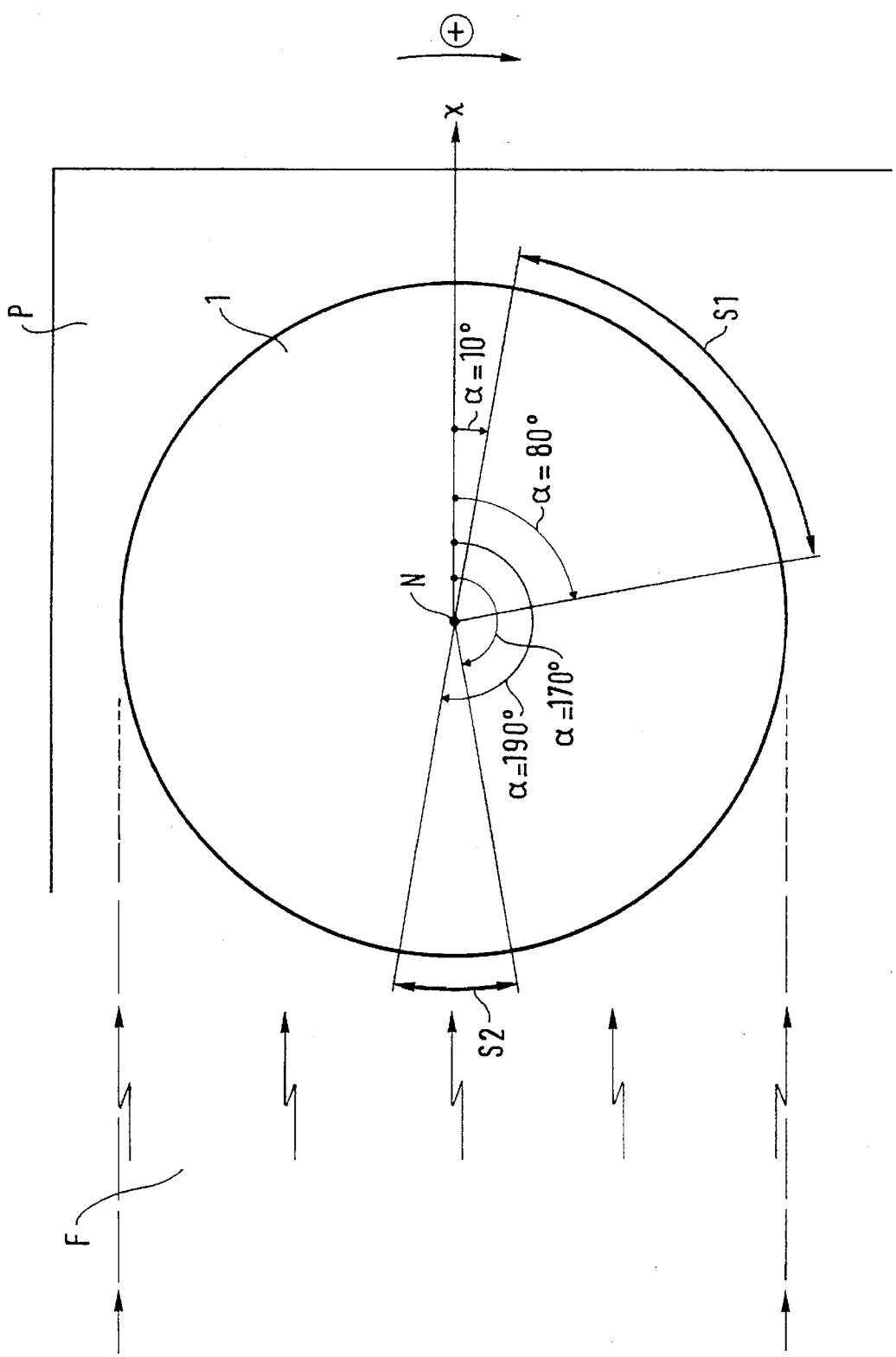
FIG. 1, already commented on, shows a cross-section of an optical fiber illuminated laterally by a light beam and indicates two angular sectors used in the prior art technique to obtain an angular radiation pattern used to detect variation in the diameter of the fiber.
Figure 2:
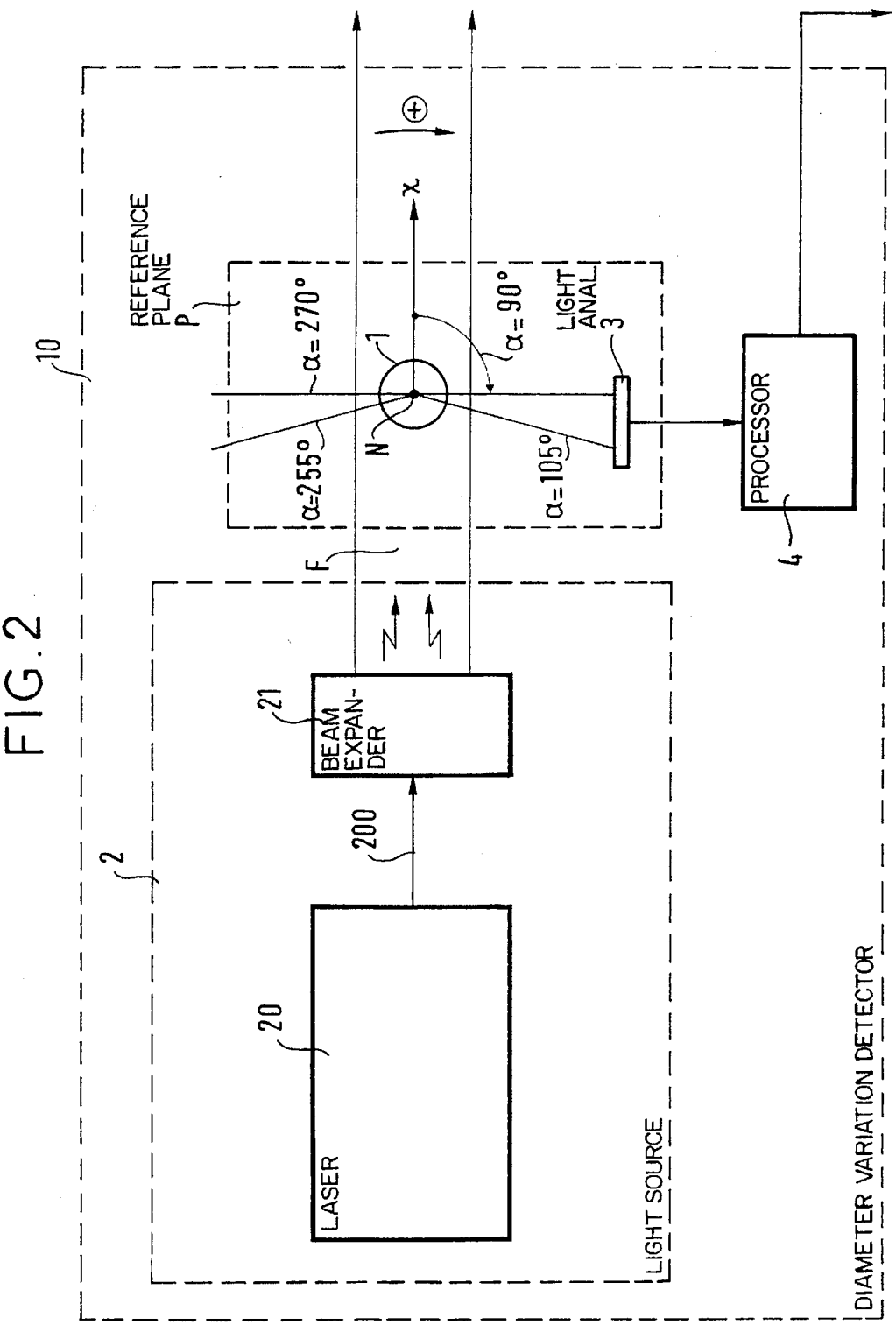
FIG. 2 is a block schematic of a device for detecting variation in the diameter of an optical fiber for implementing the method of the invention.

Referring to FIG. 2, a device in accordance with the invention for detecting variation in the diameter of an optical fiber 10 comprises a light source 2, a light analyzer unit 3 and a processor unit 4. The light source 2 comprises a helium-neon laser 20 and a light beam expander 21 in a cascade arrangement, for example. The laser produces a concentrated light beam 200 which is expanded by the expander 21 into an incident light beam F illuminating a portion of the optical fiber 1. This portion of the optical fiber 1 lies on an axis N normal to a reference plane P and moves along that axis. The incident light beam F, which lies on an axis x in the reference plane P, is projected normally onto the portion of fiber. For the purpose of defining angles, the axis x is oriented in the direction of propagation of the beam F. The light analyzer unit, typically in the form of a CCD diode strip, is positioned to receive the light waves diffused by the fiber within an acute angular sector substantially delimited by the angles of 90° and 105°, these angles being defined in the clockwise direction relative to said oriented axis. An analyzer unit 3 of this kind, the receiving surface of which covers all or part of the 90°–105° angular sector, is sensitive to the light waves diffused by the optical fiber 1 within the angular sector defined in this way, and produces a radiation pattern corresponding to that sector. The analyzer unit 3 is thus a unit for periodically measuring luminous intensity levels diffused by the illuminated optical fiber portion at respective points on the sensitive surface of the unit within the angular sector defined by the two angles of 90° and 105°. An output of the light analyzer unit 3 is connected to an input of the processor unit 4. The processor unit 4 receives said light intensity levels at the respective points on the sensitive surface of the unit 3. The processor unit 4 processes the light intensity levels in question, typically in the digital domain, to detect variation in the diameter of the optical fiber 1. The luminous intensity levels in question are periodically refreshed (updated). Detection of variation in the diameter of the optical fiber is based on modification of the radiation pattern. Two or more radiation patterns consecutively produced by the analyzer unit 3 are compared in the processor unit 4 to detect any modification of one of these consecutive patterns relative to the other.

Figure 3:
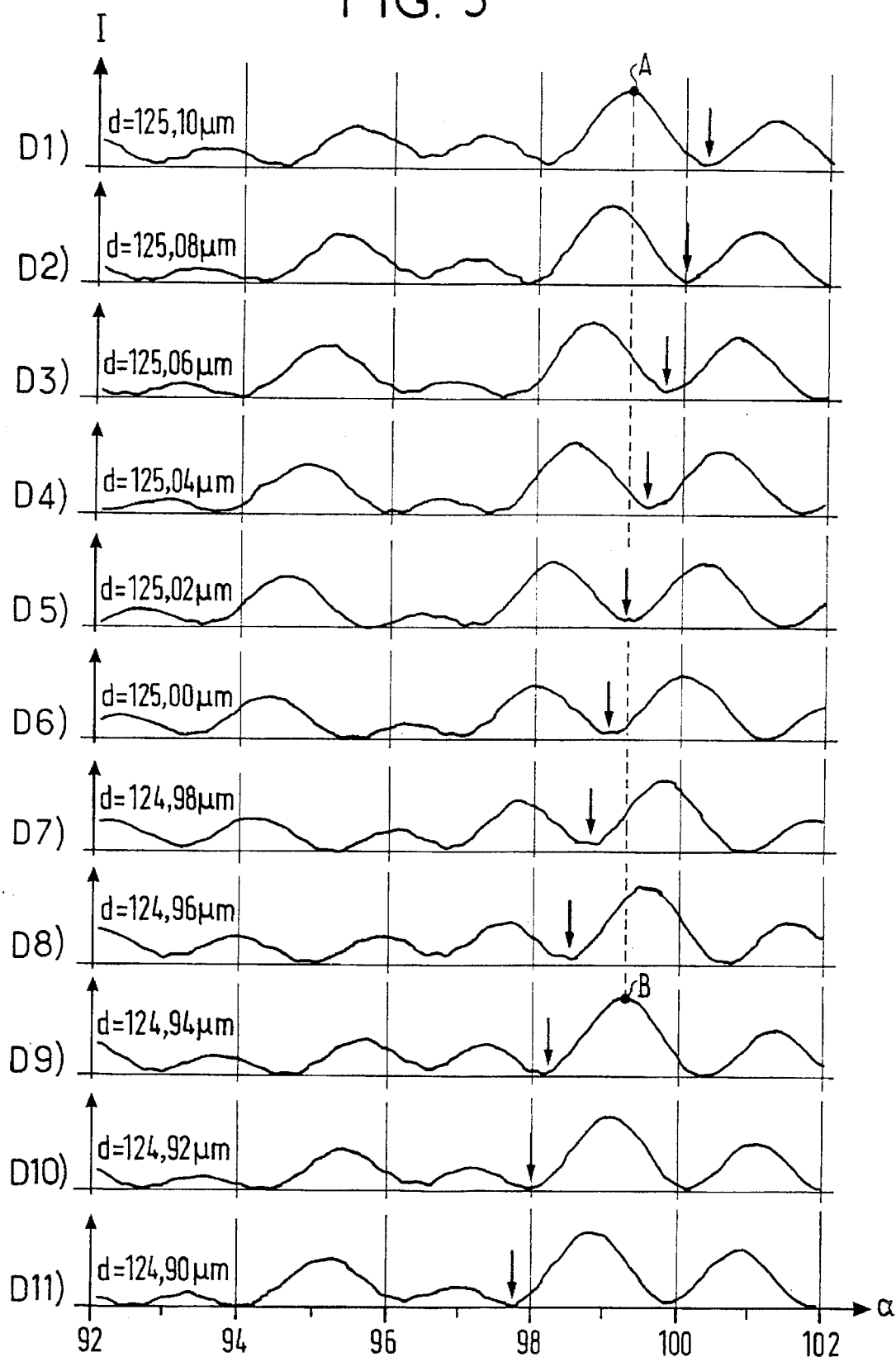
FIG. 3 shows a plurality of graphs illustrating the angular translation of the radiation pattern as a function of the diameter of an optical fiber, in the context of the invention.

FIG. 3 shows N=11 radiation patterns D1 through D11 respectively obtained for N=11 different optical fiber portions having respective diameters d decreasing in steps of 0.02 µm=20 nm from 125.10 µm to 124.90 µm. Each of these radiation patterns D1–D11 expresses the luminous intensity I as a function of the angle α measured relative to the axis x in FIG. 2, the value of α varying from 92° to 102°. Angular translation of the radiation pattern as a function of the diameter d of the fiber can be seen. As shown by the dashed line joining the points A and B, a radiation pattern is reproduced substantially identically for a variation in the diameter of the fiber approximately equal to (125.10−124.94) µm=0.16 µm=160 nm. The radiation pattern therefore has a period dependent on variation in the diameter of the fiber equal to 160 nm. Compared to the prior art, the speed of translation of the radiation pattern as a function of the fiber diameter is higher in the case of the invention, which offers commensurately increased fiber diameter variation detection sensitivity. The radiation pattern modification on which the detection of variation in the diameter of the fiber is based is advantageously an angular translation, within the angular sector in accordance with the invention, of a maximal intensity level of the light diffused by the optical fiber. This maximal luminous intensity level is indicated by the point A in diagram D1 in FIG. 3. This choice is based on the fact that the device 3 can more easily and more accurately detect a high level. The threshold for detection of variation in the diameter of the fiber, largely depending on the accuracy of currently available analyzer devices 3, is substantially equal to 20 nm in practise, which constitutes a very small diameter variation. Although the embodiment described above is limited to the 90°–105° angular sector for analyzing the radiation pattern, in a second embodiment of the invention the 255°–270° angular sector is used, as shown in FIG. 2. This embodiment is based on the symmetrical nature of the results of optical phenomena in the 90°–105° and 255°–270° angular sectors.

Figure 4:
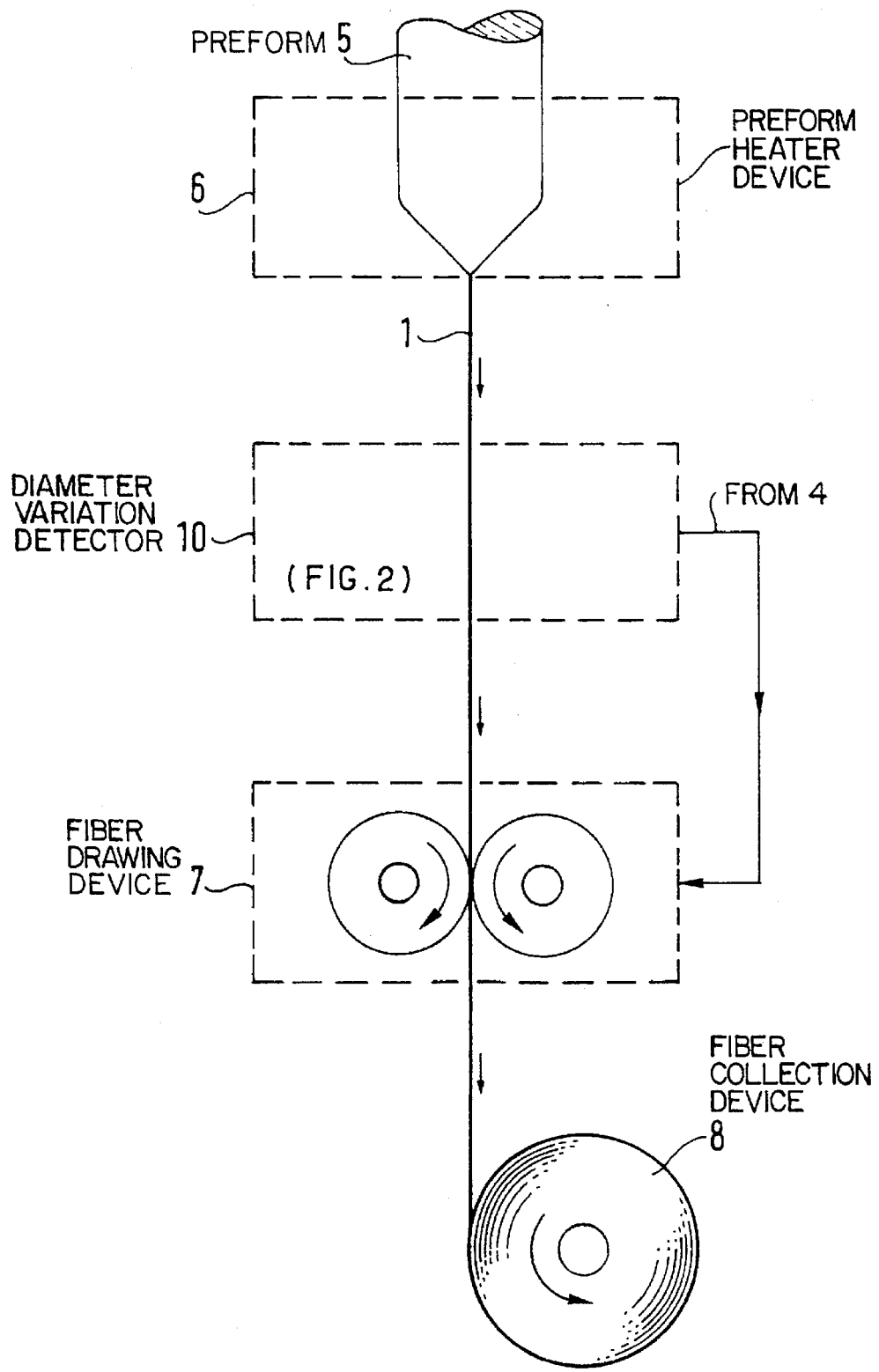
FIG. 4 shows an optical fiber fabrication system taking advantage of the method in accordance with the invention for detecting variation in the diameter of an optical fiber.

On the basis of the foregoing disclosure, the invention provides an optical fiber fabrication method described next with reference to FIG. 4. An optical fiber fabrication system typically comprises a device 6 for heating a preform, an optical fiber drawing device 7, a device (not shown) for applying the cladding to the fiber 1 and an optical fiber collection device 8. Part of a glass preform 5 is heated by the heater device 6. The device 7 draws an optical fiber 1 from the heated preform 5. The optical fiber 1 formed in this way moves at a constant speed into the device 8 where it is collected, for example wound. The invention proposes to place a device 10 in accordance with the invention as described with reference to FIG. 2 on the path of movement of the fiber. This latter device comprises exactly the same means arranged in the same way as in either of the embodiments described with reference to FIG. 2. The processor device 4 (FIG. 2) is adapted to detect variation in the radiation patterns consecutively obtained and controls the speed of the fiber via a feedback loop with the result that the current angular radiation pattern is slaved to a reference radiation pattern corresponding to that obtained when the device 4 is activated. This feedback guarantees that the fiber is formed with a substantially constant diameter, with very great accuracy. The speed of the fiber can be controlled by having the device 4 control the speed of the drawing device 7, for example. Note that this optical fiber fabrication system can use, in combination, a method in accordance with the invention for detecting variation in the diameter of the optical fiber characterized by a particular angular sector for analyzing the radiation pattern and a conventional detection method using a different angular sector, known from the prior art. In this case, the conventional method guarantees uniformity of the fiber diameter to within relatively coarse variations in a given range and the method of the invention is operative within that range to regularize the fiber diameter to within very small fluctuations.

The diameter of an optical fiber obtained by means of a fabrication method of this kind is especially regular.

There is claimed:

1. A method of detecting variation in the diameter of a substantially cylindrical elongate optical body at least one portion of which lies on an axis normal to a reference plane, comprising the following steps:

illuminating a portion of said optical body by means of an incident light beam that lies on an axis in said reference plane and is oriented in the propagation direction of said light beam, said optical body moving relative to said light beam, successively measuring luminous intensity levels of light diffused by said portion of said body at respective points of said reference plane delimited by a predetermined acute angular sector about said normal axis in order to produce a plurality of angular radiation patterns, said angular sector being defined by two angles that have an apex formed by the intersection of said normal axis and said reference plane, and comparing and detecting variation in said angular radiation patterns of the diffused light produced by said moving elongate optical body to thereby detect a variation in said diameter of said elongate optical body, said angular sector being substantially defined by the two angles of 90° and 105° defined in the clockwise direction relative to said oriented axis.

2. A method according to claim 1 wherein said variation of said radiation pattern is an angular translation within said angular sector of a maximal intensity level of light diffused by said portion of said elongate body.

3. A method according to claim 2 wherein said comparing step further comprises comparing two consecutively produced radiation patterns.

4. A device for implementing the method as claimed in claim 1, comprising:

a light source for producing said incident light beam, light analyzer means adapted to produce said radiation pattern and having a receiving surface covering all or part of said angular sector, and processor means for detecting modification of said angular radiation pattern.

5. Device according to claim 4, wherein variation in said diameter of said elongate body is detected by comparing two consecutively produced radiation patterns; and wherein said processor means comprise means for comparing two consecutively produced radiation patterns.

6. A method of detecting variation in the diameter of a substantially cylindrical elongate optical body at least one portion of which lies on an axis normal to a reference plane, comprising the following steps:

illuminating laterally a portion of said optical body by means of an incident light beam that lies on an axis in said reference plane and is oriented in the propagation direction of said light beam, said optical body moving relative to said light beam, successively measuring luminous intensity levels of light diffused by said portion of said body at respective points of said reference plane delimited by a predetermined acute angular sector about said normal axis in order to produce a plurality of angular radiation patterns, said angular sector being defined by two angles that have an apex formed by the intersection of said normal axis and said reference plane, and comparing and detecting variation in said angular radiation patterns of the diffused light produced by said moving elongate optical body to thereby detect a variation in said diameter of said elongate optical body, said angular sector being substantially defined by two angles of 255° and 270° defined in the clockwise direction relative to said oriented axis.

7. A method of fabricating an optical fiber, comprising the following steps:

heating a preform, drawing said optical fiber from said heated preform so that said optical fiber is moving, said fiber lying on an axis normal to a reference plane, illuminating a portion of said optical fiber by means of an incident light beam lying on an axis in said reference plane and oriented in the propagation direction of said light beam, successively measuring intensity levels of light diffused by said optical fiber at respective points in said reference plane delimited by a predetermined acute angular sector about said normal axis in order to produce a plurality of angular radiation patterns, said angular sector being delimited by two angles that have an apex formed by the intersection of said normal axis and said reference plane, comparing and detecting variation in said angular radiation patterns of the diffused light produced by said optical fiber which is being drawn, thereby detecting variation in said diameter of said optical fiber, and applying feedback to control the speed of said optical fiber so as to slave said angular radiation pattern so produced to a reference radiation pattern, wherein said angular sector is substantially defined by the two angles 90° and 105° defined in the clockwise direction relative to said oriented axis.

8. A method of fabricating an optical fiber, comprising the following steps:

heating a preform, drawing said optical fiber from said heated preform so that said optical fiber is moving, said fiber lying on an axis normal to a reference plane, illuminating a portion of said optical fiber by means of an incident light beam lying on an axis in said reference plane and oriented in the propagation direction of said light beam, successively measuring intensity levels of light diffused by said optical fiber at respective points in said reference plane delimited by a predetermined acute angular sector about said normal axis in order to produce a plurality of angular radiation patterns, said angular sector being delimited by two angles that have an apex formed by the intersection of said normal axis and said reference plane, comparing and detecting variation in said angular radiation patterns of the diffused light produced by said optical fiber which is being drawn, thereby detecting a variation in said diameter of said optical fiber, and applying feedback to control the speed of said optical fiber so as to slave said angular radiation pattern so produced to a reference radiation pattern, wherein said angular sector is substantially defined by the two angles 255° and 270° defined in the clockwise direction relative to said oriented axis.

* * * * *